United States Patent

[11] 3,596,689

[72] Inventor John W. Oehrli
 Pacific Palisades, Calif.
[21] Appl. No. 447,434
[22] Filed Apr. 12, 1965
[45] Patented Aug. 3, 1971
[73] Assignee Textron, Inc.
 Providence, R.I.
 Continuation-in-part of application Ser. No. 195,519, May 17, 1962, now Patent No. 3,260,287.

[54] SAW CHAINS AND SHARPENERS
 31 Claims, 10 Drawing Figs.
[52] U.S. Cl. ..................................... 143/32, 143/135
[51] Int. Cl. ..................................... B27b33/14, B27b 17/02
[50] Field of Search ........................... 143/135, 135-7, 135-8, 32, 32-14

[56] References Cited
 UNITED STATES PATENTS

| | | | |
|---|---|---|---|
| 3,263,717 | 8/1966 | Silvon | 143/135 |
| 2,989,096 | 6/1961 | Irgens | 143/135 |
| 2,508,784 | 5/1950 | Cox | 143/135 |
| 2,744,548 | 5/1956 | Stephenson et al. | 143/135 |
| 2,884,031 | 4/1959 | Standal | 144/114 |
| 2,976,900 | 3/1961 | Mills | 143/135 |
| 3,147,644 | 9/1964 | Oehrli | 143/135 X |
| 3,170,497 | 2/1965 | Ehler et al. | 143/135 |

Primary Examiner—Donald R. Schran
Attorney—Robert E. Burns

ABSTRACT: In a saw chain running on an elongated cutter bar and travelling in an approximately circular path at at least one end of said cutter bar and in an approximately straight path between the ends of said cutter bar, a link comprising an approximately planar body portion, means adjacent opposite ends of said body portion pivotally connecting said link with preceding and succeeding links, a depth gauge portion projecting upwardly from the forward end portion of said body portion, a side portion spaced rearwardly from said depth gauge portion and extending upwardly from said body portion and offset laterally outwardly from the longitudinal center line of the chain, and a cutter portion extending from said side portion inwardly over said body portion at least to the center line of said chain, said cutter portion being defined by a front face inclined at an acute angle to a line connecting the pivot axes of said pivotal connecting means, a rear face substantially equidistant from said front face and an upper edge face defined by a convex surface of revolution concentric with said approximately circular path when said link is travelling therein, said edge face intersecting said rear face at an obtuse angle and intersecting said front face at an acute angle to define a cutting edge disposed between said pivot axes, whereby said cutting edge is resharpened by progressively dressing down said upper edge face by engagement with cutting means as said link travels along said approximately circular path, said cutting edge being disposed rearwardly of the midpoint between said pivot axes and tangents to said convex surface of said upper edge face rearwardly of said cutting edge being inclined at small angles to a line connecting said pivot axes to provide clearance.

SAW CHAINS AND SHARPENERS

This application is a continuation-in-part of my application, Ser. No. 195,519 filed May 17, 1962 now U.S. Pat. No. 3,260,287.

The present invention relates generally to chain saws and particularly to an improved saw chain and saw chain sharpener combination.

It is well recognized by users of chain saws that the cutting teeth of the saw chain must be sharpened periodically to maintain their optimum cutting efficiency. The actual operation of sharpening the teeth, however, is difficult and tedious if done by hand because of the precision with which each tooth must be sharpened, the shape of most saw chain teeth which renders proper sharpening thereof difficult even for the most skillful chain saw users and the large number of teeth, frequently of different types, which are contained in the average saw chain.

When a saw chain is sharpened by hand, the saw must be stopped and, in some instances, the chain is removed from the cutter bar of the saw. The sharpening operation thus interrupts the use of the saw for a substantial period of time. In the lumbering operations, saw chain operators are customarily paid on the basis of the quantity of wood they cut. Hence, "-down time" required for sharpening the saw chain represents a substantial loss in the operator's earnings. Because of the time required for sharpening a saw chain, the chain may be sharpened only when it has become too dull to cut. However, the cutting efficiency of a chain saw progressively decreases from a maximum with a sharp chain to a minimum when the saw will no longer cut properly. Hence, if the saw chain is sharpened only when it has become quite dull, it follows that the saw is operating at low efficiency much of the time. Moreover, when using a chain saw with a dull or partially dull chain, the operator tends to apply more pressure in an effort to force the saw into the work and thereby maintain cutting speed. This increased pressure, in combination with the greater resistance encountered by the chain because of the dull teeth, places an abnormal strain on the chain and on all operating portions of the saw, thereby increasing the likelihood of breakage and shortening the life of the chain saw through excessive wear.

It is a general object of the present invention to provide an improved saw chain and saw chain sharpener combination which permits the chain to be sharpened quickly and easily by power while the saw is running. It is a further object of the invention to enable the chain saw operator to sharpen the saw chain in a simple manner requiring no particular skill on the part of the operator. Moreover, the saw chain teeth are sharpened in a precise and uniform manner so as to assure smooth operation and continued high efficiency of the chain saw. This is of particular importance for farmers, construction workers and others who use chain saws only at intervals and hence do not become professional or proficient in sharpening the saw chain. Moreover, by eliminating both the delay and the skill heretofore required for sharpening the saw chain, the invention makes it feasible to touch up the cutting teeth of the chain at frequent intervals and thus keep the saw operating at peak efficiency. The amount of wood that can be cut by an operator is thus increased not only by eliminating the down time required for sharpening the chain, but also by the increased average efficiency at which the saw operates by reason of the teeth being kept always sharp.

A further object of the invention is to provide an improved saw chain which is suitable for sharpening by power while the saw is running. While various types of saw chains have heretofore been used and proposed, it has been found that for most types of cutting, best results are obtained with a "chipper"-type chain. The name is derived from the fact that, in contrast with chains having scratcher teeth for severing wood particles in the kerf and raker teeth for removing the severed particles, a chipper-type saw chain has only one kind of hooklike teeth which both sever and remove chips of wood from the kerf. Although power sharpener devices for scratcher-type chain have heretofore been proposed, it has been necessary to sharpen chipper-type chains by hand, for example with a round file which must be held at a particular angle. It is an object of the present invention to provide a chipper-type saw chain having cutting teeth of such configuration that they can be sharpened by power while the saw is running, for example merely by positioning an abrasive sharpening implement in position to be engaged by the teeth of the chain.

In order to control the cutting of chipper-type saw chains, it is customary to provide each cutter with a depth gauge which regulates the depth of cut and contributes to smooth operation of the saw. The depth gauge may be provided on the forward portion of the link that carries the cutter or on a preceding link. As the cutters wear down during use, it is necessary to dress down the tops of the depth gauges in order to maintain the correct relationship between the depth gauges and the cutters.

A further object of the invention is to provide a combination of a saw chain of a construction adapted to be sharpened by power while the saw is running and a sharpener adapted to effect the sharpening of the chain. The construction and operation of the sharpener is described more fully in my above mentioned copending application, Ser. No. 195,519.

The objects and advantages of the present invention will further appear from the following description and claims in conjunction with the accompanying drawings in which, FIG. 1 is a side elevation of a chain saw constructed in accordance with my invention, with a portion of the handle and saw bar of the chain saw broken away.

Figure 1:
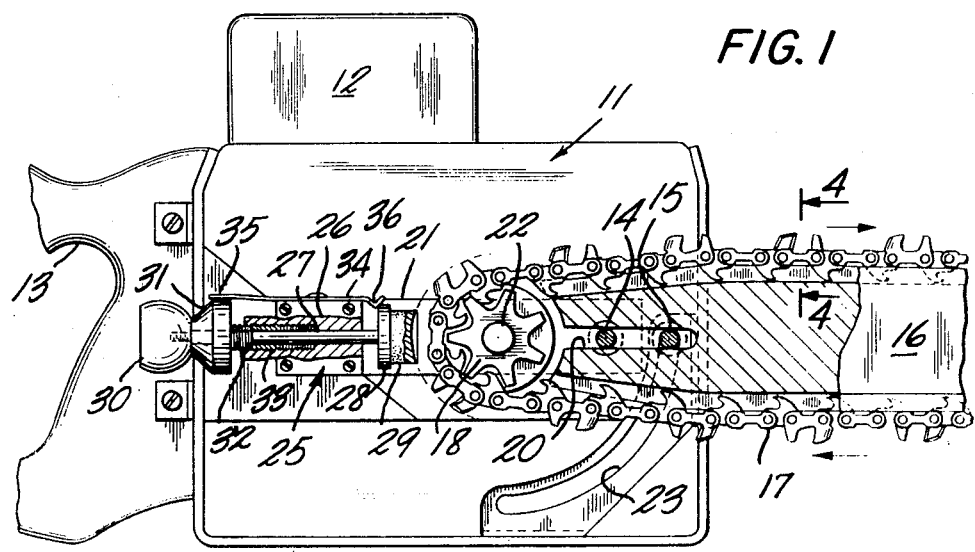

In FIG. 1 of the drawings, the present chain saw, which is shown more fully in my copending application, Ser. No. 195,519, will be seen to comprise a frame 11 including a housing 12 which encloses a small internal combustion engine (not shown) or other suitable prime mover for the chain saw. Attached to the rear of the frame 11, is a handle 13 by which the chain saw may be held. Also, attached to the frame 20 by means of bolts 14 and 15, is a saw bar 16 which is sometimes referred to as a cutter bar.

Trained about the cutter bar 16 is a saw chain 17 which is constructed in accordance with this invention and will be described below. At the rear end of the cutter bar 16, the chain 17 passes around and is driven by a sprocket 18. At the forward end of the cutter bar, the chain 17 passes around a rounded nose portion (not shown) which may, if desired, be provided with a roller to reduce friction.

The cutter bar 16 is mounted so as to be adjustable longitudinally and also angularly with respect to the sprocket. Bolt 14 passes through a longitudinal slot 20 in the rear end of the cutter bar and through a bolt hole in a supporting plate 21 which is rotatably supported on the shaft 22 of the chain saw engine. Bolt 15 passes through the longitudinal slot 20 in the rear end of the cutter bar and through an arcuate slot 23 in the frame 11 of the chain saw. The arcuate 23 is concentric with the engine shaft 22 and hence with the sprocket 18. If the bolt 15 is loosened, the cutter bar 16 together with the supporting plate 21 may be rotated about the engine shaft 22 as a center and may be locked in selected angular position by tightening the bolt 15. If both of the bolts 14 and 15 are loosened, the cutter bar 16 can be adjusted the tightness of the chain 17 on the bar, and can be locked in selected position.

Mounted on the saw frame 11 to the rear of the sprocket drive 18 is an improved saw chain sharpener 25 in accordance with the invention. The sharpener 25 is shown as comprising a bearing 26 which is rigidly attached to the supporting plate 21. Slidably and rotatably journaled in this bearing is a shaft 27 which at its forward end carries a disc 28 on which a cylindrical honing stone 29 is bonded or otherwise secured. A knob 30 is fixed on the left hand end of the sharpener shaft 27 as seen in FIG. 1. A stop nut 31 is rotatable and axially slidable on the shaft 27 between the knob 30 and the bearing 26. The stop nut 31 has an externally threaded stem portion 32 which is screwed into an internally threaded sleeve portion 33 rigid with the bearing 26.

As will be seen in FIG. 1, the sharpener 25 is positioned so as to be engaged by cutter links of the saw chain 17 as it travels in a circular path about the axis of the sprocket 18. Through axial movement of the shaft 27, the sharpening stone 29 is movable from a rearward inoperative position in which it is disengaged from the saw chain to a forward operative position in which it is engaged by the cutter links as they are carried along a circular path by the sprocket 18. The stop nut 31 limits the forward movement of the sharpener and thereby limits the amount of metal removed from the chain in the sharpening operation while, at the same time, assuring that all cutter links of the chain are uniformly sharpened. The forward movement of the sharpener is adjustable by rotating the stop nut 31 so as to screw it into or out of the sleeve 33. Fixed to the bearing 26, is a leaf spring 34, the left-hand end of which carries a detent 35 engageable with serrations formed on the periphery of the stop nut 31. The leaf spring 34 thus serves releasably to restrain the stop nut 31 against rotation and thereby releasably to lock the stop nut in adjusted axial position. The length of the detent 35 and the leaf spring 34 is made such as to be engageable with the serrations on the periphery of the stop nut in all axial positions of adjustment. At the right-hand end of the leaf spring 34 there is provided a transverse detent portion 36 which is engageable with the disc 28 releasably to hold the sharpener in inoperative position when it is moved to such position by pulling on the knob 30.

As will be described more fully below, the sharpener 25 is designed to hone the cutting teeth on the saw chain 17 as these teeth move around the sprocket 18 and pass the sharpener. To accomplish this honing action, the operator grips knob 30 and moves the sharpener to the right as viewed in FIG. 1 so as to bring the sharpener into engagement with the chain. The extent of engagement is adjustable by turning the stop nut 31 so as to screw its threaded stem portion 32 into or out of the sleeve 33. During the sharpening operation, the sharpening stone 29 is simultaneously rotated about the axis of the shaft 27 by manually turning the knob 30. As will be seen from FIG. 1, the axis of shaft 22 of the sharpener is direct toward and approximately intersects the axis of the sprocket 18. The slow rotation of the sharpening stone during the sharpening operation distributes the wear on the stone and maintains the face of the stone as a spherical surface concentric with the axis of the sprocket so that dressing of the stone is not required.

The saw chain in accordance with the present invention is characterized by being of the chipper type and capable of being sharpened while the chain saw is running by engagement with an abrasive or other cutting element. As illustrated in FIGS. 1 to 4, the saw chain 17 comprises left-hand cutter links 40, right-hand cutter links 41 and connecting links including central drive links 42 and tie links 43. Successive links are pivotally connected with one another by pins or rivets 44. Each of the drive links 42 is provided with a downwardly projecting tooth portion 45 adapted to be received between successive teeth of the sprocket 18 to drive the chain. The right and left hand cutters alternate and are mirror images of one another. Each of the cutter links comprises a body portion 46 which is substantially planar and is provided near its opposite ends with holes receiving the rivets 44 which pivotally connect the cutter link to preceding and succeeding links. A depth gauge portion 47 projects upwardly from the forward end portion of the body 46 and extends forwardly of the forward pivot axis of the links. The depth gauge portion 47 is shown as lying in substantially the same plane as the body portion 46. The upper end of the depth gauge portion may, if desired, be of reduced thickness so as to reduce the bearing surface of the depth gauge on the kerf.

Spaced rearwardly from the depth gauge portion 47 is an upwardly projecting side portion 48 which is offset laterally outwardly from the central plane of the chain as defined by the median plane of the drive links 42. An integral tab forming a cutter portion 49 is bent inwardly from the side portion 48 toward the central plane of the chain and extends at least to and preferably slightly beyond the central plane. The cutter portion 49 has a front face which is inclined at an acute angle to a line connecting the pivot axes of the cutter link, a rear face which is substantially equidistant from the front face and hence is similarly inclined and an upper edge face 50 which is defined by a surface of revolution concentric with the sprocket when the cutter link is positioned on the sprocket. The upper edge face 50 of the cutter portion intersects the rear face at an obtuse angle and intersects the front face at an acute angle to define a cutting edge of the cutter portion. The angle of inclination of the front face of the cutter portion to the line connecting the pivot axes, and hence to the direction of travel of the chain when on the approximately straight side portions of the cutter bar, is selected to provide a cutting edge having an included angle appropriate for the sawing operation for which the saw is intended. For cutting wood, it has been found that the angle of inclination of the front face of the cutter portion should be of the order of 40° and 50° and preferably is approximately 45°. The cutter portion 49 is also preferably inclined transversely relative to the median plane of the body portion 46 of the link in such manner that its free lateral edge is higher than its junction with the side portions 48. The cutting edge of the tooth is inclined rearwardly and laterally away from the side portion 48. As viewed in plan, looking down from the top of the saw chain, the angle of inclination of the cutting edge to the median plane of the cutter link is of the order of 65° to 75° and preferably about 73°. The forward edge 51 of the side portion 48 is preferably also bevelled to provide a side cutting edge. If desired, the upper edge of the side portion 48 may also be bevelled to form a chisel edge 52. While the cutter portion 49 is shown substantially flat except for a radius joining it with the side portion 48, it may, if desired, be of curved cross section with its forward face somewhat concave.

When the sharpener 25 is brought into operative position, as described above, while the saw is running, the upper edge faces 50 of the cutter portions 49 of the left and right hand cutter links 40, 41 successively engage the concave face of the sharpening stone 29 and are thereby honed or dressed down so as to resharpen the cutting edges of the teeth. Since a line connecting the forward and rearward pivot points of each cutter link extends as a chord of the circular path which the link travels when going around the sprocket, the distance from the median point of such line to the surface of such stone 29 is greater than the distance from the pivot points to said surface. The surfaces of the link which engage the stone 29 thus lie in an arcuate surface concentric with the axis of the sprocket. When the links are travelling along the relatively straight side portions of the cutter bar, the more nearly central portions of the surfaces which have engaged the sharpening stone 29 are higher than portions of such surfaces at the ends of the links. By reason of this relationship, the cutting edge 50—which is located rearwardly of the center of the link—is provided with a suitable amount of draft to enable it to cut properly. The top surfaces of the depth gauge portions 47 are also engaged by and dressed down by the sharpening stone 29 so as to reduce the height of the depth gauges uniformly and progressively as the chain is repeatedly resharpened. The side cutting edges 51 are not resharpened by the sharpening device 25. However, since wood is removed from the kerf primarily by the top cutting edges 50, the side cutting edges require only infrequent sharpening and this can easily be done by hand since the edges are straight and readily accessible.

Figure 2:
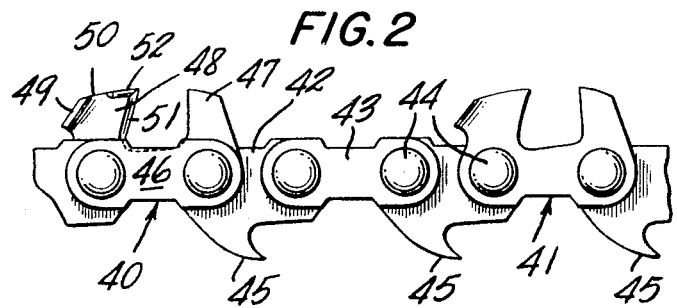
FIG. 2 is a side elevation on a larger scale of a portion of the saw chain shown in FIG. 1.
Figure 5:
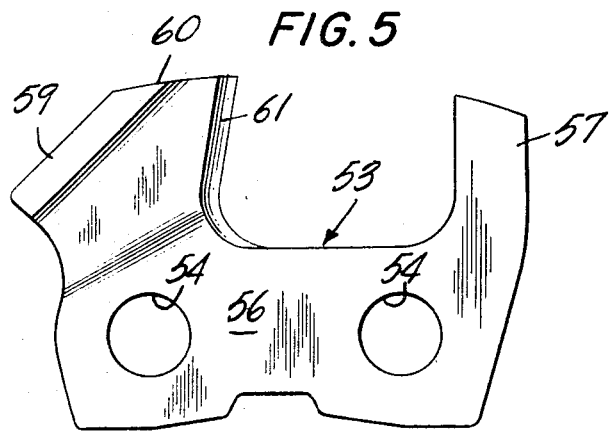
FIG. 5 is a side view on a larger scale of a cutter link of a modified saw chain.
Figure 7:
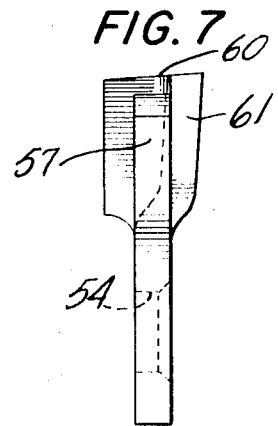
FIG. 7 is a front end view of the link shown in FIG. 5.
Figure 6:
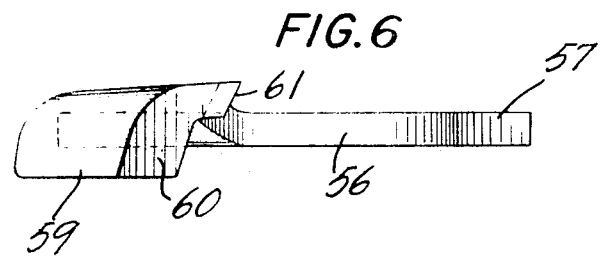
FIG. 6 is a top view of the link shown in FIG. 5.

In FIGS. 5 to 7, there is shown another embodiment of a left hand cutter link 53, it being understood that the right hand cutter links are mirror images and that left and right hand cutter links are arranged alternately in the chain as illustrated in FIG. 2. The link is shown as having a substantially planar body portion 56 provided near its opposite ends with pivot holes 54. A depth gauge portion 57 projects upwardly from the front end body portion at a location in front of the forward pivot hole 54. Space rearwardly from the depth gauge portion 57 is an upwardly projecting side portion 58 which is offset laterally and slightly inclined relatively to the body portion 56 as seen in FIG. 7. An integral cutter portion 59 is bent inwardly from the side portion 58 and extends at least to the central plane of the saw chain. The cutter portion 59 is inclined at an acute angle to a line connecting the pivot axes of the cutter link as defined by the rivet holes 54. The upper edge face 60 of the cutter portion 59 is defined by a surface of revolution which is concentric with the sprocket around the saw chain. The upper edge face 60 of the cutter portion intersects the front face at an acute angle to define a cutting edge having an included angle of the order of 40° to 50° and preferably about 45°. The cutter portion 59 is also inclined transversely relative to the median plane of the body portion 56 of the cutter link so that its free lateral edge is higher than its junction with the side portion 58. The included angle between the side portion 58 and cutter portion 59 is preferably of the order of 120°. However, as seen from the drawings, the side portion 58 and cutter portion 59 join in an arc. The cutting edge defined by the forward face of the cutter portion 59 and the upper edge face 60 as viewed from above the saw chain is inclined at an angle of the order of 65° to 75° to the median plane of the cutter link. The forward edge of the side portion 58 is bevelled as indicated in 61 to provide a side cutting edge.

Cutter links of the kind shown in FIGS. 5 to 7 are resharpened by means of the sharpening device 25 in the manner described above. Since the depth gauge portion 57 is ahead of the forward pivot axis of the link while the cutting edge of the cutter portion 59 is located between the axes, the depth gauge is progressively dressed down during successive sharpening operation by means of the sharpening device 25 so as to be lower than the cutting edge when the link is travelling in an approximately straight path as defined by the side edge of the cutter bar. This is the proper relationship of the depth gauge to the cutting edge for normal sawing operations.

Figure 3:
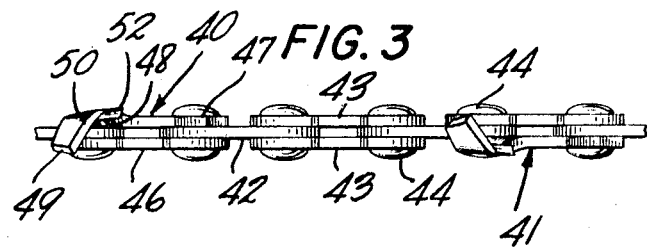
FIG. 3 is a top view of the portion of chain shown in FIG. 2.
Figure 4:
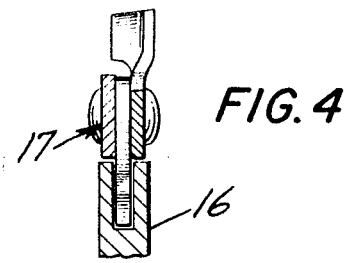
FIG. 4 is a cross section of the chain and adjacent portion of the saw bar taken approximately on the line 4—4 in FIG. 1.
Figure 8:
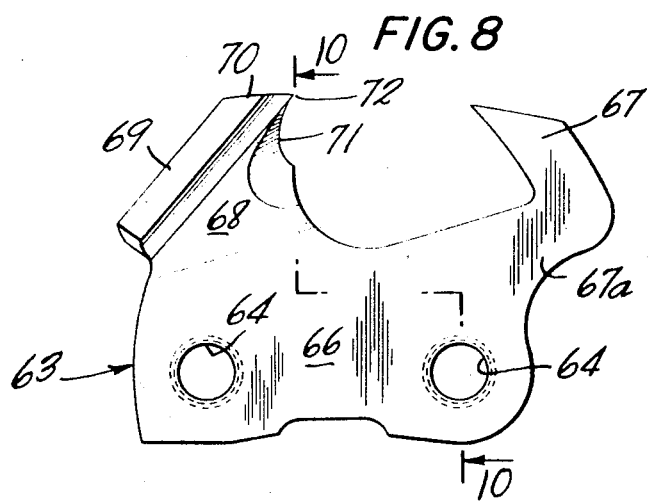
FIG. 8 is a side elevation of another embodiment of cutter link.
Figure 10:
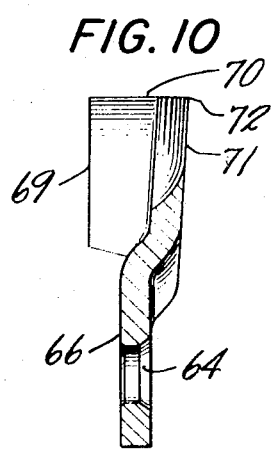
FIG. 10 is a cross section taken approximately on the line 10—10 in FIG. 8.
Figure 9:
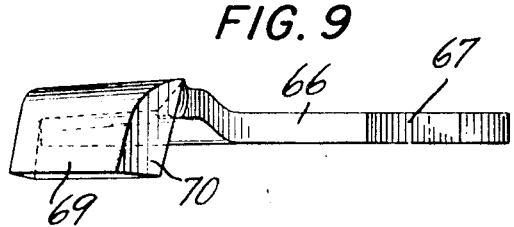
FIG. 9 is a top view of the link shown in FIG. 8.

In FIGS. 8 to 10, there is shown another embodiment of a left-hand cutter link adapted to be incorporated in a saw chain together with right-hand cutter links, which are mirror images of the link illustrated, and suitable connecting links as illustrated in FIGS. 1 to 3. The link 63 shown in FIGS. 8 to 10 comprises an approximately planar body portion 66 having pivot holes 64 near its ends. At the forward end of the body portion 66, a depth gauge portion 67 projects upwardly from a forwardly extending portion 67a. The depth gauge portion 67 has forward and rearward edge faces which are arcuate and concentric with the axis of the rear pivot hole 64 and an upper face which is concentric with the curved path which the link travels in passing around the end of the cutter bar. It will be seen that the depth gauge portion 67 is inclined upwardly and rearwardly. The link 63 further has a side portion 68 which extend upwardly from and is offset laterally from the body portion 66. A cutter portion 69 extends inwardly from the side portions 68 at least to the center line of the chain and is inclined in a fore and aft direction and also laterally as described above with reference to the preceding figures. The cutter portion 69 has an upper edge face 70 which, like the top edge surface of the depth gauge portion 67, lies in a surface of revolution concentric with the curved path travelled by the link in passing around an end of the cutter bar. A forward edge portion 71 of the side portion 68 is sharpened arcuately as seen in FIG. 8, for example by a round file or round grinding stone. The cutting edges of the cutter portion 69 and side portion 68 substantially intersect at a point 72. As seen in FIG. 9, the cutting edge of the cutter portion 69 as seen from above is inclined to the median plane of the base portion so as to effect a slicing cut.

Cutter links of the kind shown in FIGS. 8 to 10 and opposite cutter links, which are mirror images of the ones shown, are adapted to be incorporated in a chain as illustrated in FIGS. 1 to 3 and to be sharpened by a sharpening device such as the sharpening device 25 while the chain is running on the cutter bar of the chain saw. When the chain is repeatedly resharpened in the manner described, the height of the depth gauge 67 is progressively reduced as the cutting portion 69 is dressed down to restore the cutting edge defined by the intersection of the upper edge face 70 and the inclined forward face of the cutting portion 69. Since the depth gauge portion 67 is ahead of the forward pivot axis defined by the pivot hole 64 at the forward end of the link, while the cutting edge of the link is disposed between the pivot axes, the top surface of the depth gauge portion is ground down by the sharpening device so that when the cutter links are running in a substantially straight path as on the side edge of the cutter bar, the depth gauge is lower than the cutting edge. Moreover, it will be noted that as the cutting edge of the cutter portion 69 moves rearwardly through repeated sharpenings of the saw chain, the top edge surface of the depth gauge portion 67 moves forwardly by reason of the inclination of the depth gauge so that the desired relationship between the depth gauge and the cutting edge is maintained throughout the life of the chain.

In the foregoing description, the term "upwardly" as used in describing the saw chain links designates a direction outwardly away from the cutter bar, it being understood that the position of the links changes as they travel around the cutter bar. It will be further understood that the various features of the several embodiments of the invention shown and described are mutually interchangeable with one another insofar as they are compatible. Moreover, it will be apparent to those skilled in the art that various modifications can be made within the scope of the invention. For example, while it has been found more convenient to mount the sharpening device at the rear end of the chain where the chain links are travelling in a circular path around the sprocket, it may, if desired, be mounted on the forward end of the chain where the links are travelling in a similar curved path. The invention is hence not intended to be limited to the particular embodiments shown by way of example in the drawings.

What I claim is:

1. In a saw chain running over a rotating sprocket, a link comprising an approximately planar body portion, means adjacent opposite ends of said body portions pivotally connecting said link with preceding and succeeding links, a side portion extending upwardly from said body portion and offset laterally outwardly from the longitudinal centerline of the chain, and a cutter portion extending from said side portion inwardly over said body portion at least to the centerline of said chain, said cutter portion being defined by a front face inclined at an acute angle to a line connecting the pivot axes of said pivotal connecting means, a rear face substantially equidistant from said front face and an upper edge face defined by a convex surface of revolution concentric with said sprocket when said link is positioned on said sprocket, said edge face intersecting said rear face at an obtuse angle and intersecting said front face at an acute angle to define a cutting edge of said cutter portion, whereby said cutting edge is resharpened by progressively dressing down said upper edge face by engagement with cutting means as said link is carried in a circular path by rotation of said sprocket, said cutting edge being disposed rearwardly of the midpoint between said pivot axes and tangents to said convex surface of said upper edge face rearwardly of said cutting edge being inclined at small angles to a line connecting said pivot axes to provide clearance.

2. A saw chain link according to claim 1, in which the angle of inclination of said front face of said cutter portion to said line connecting said pivot axes is of the order of 40° to 50°.

3. A saw chain link according to claim 1, in which the angle of inclination of said front face of said cutter portion to said line connecting said pivot axes is approximately 45°.

4. A saw chain link according to claim 1, in which said cutting portion is also inclined relative to the medium plane of said body portion in the sense that its free lateral edge is higher than its junction with said side portion, and in which said cutting edge is inclined rearwardly and laterally away from said side portion.

5. A saw chain link according to claim 1, in which the forward edge of said side portion is sharpened to provide a side cutting edge.

6. In a saw chain running on an elongated cutter bar and travelling in an approximately circular path at at least one end of said cutter bar and in an approximately straight path between the ends of said cutter bar, a link comprising an approximately planar body portion, means adjacent opposite ends of said body portion pivotally connecting said link with preceding and succeeding links, a depth gauge portion projecting upwardly from the forward end portion of said body portion, a side portion spaced rearwardly from said depth gauge portion and extending upwardly from said body portion and offset laterally outwardly from the longitudinal center line of the chain, and a cutter portion extending from said side portion inwardly over said body portion at least to the center line of said chain, said cutter portion being defined by a front face inclined at an acute angle to a line connecting the pivot axes of said pivotal connecting means, a rear face substantially equidistant from said front face and an upper edge face defined by a convex surface of revolution concentric with said approximately circular path when said link is travelling therein, said edge face intersecting said rear face at an obtuse angle and intersecting said front face at an acute angle to define a cutting edge disposed between said pivot axes, whereby said cutting edge is resharpened by progressively dressing down said upper edge face by engagement with cutting means as said link travels along said approximately circular path, said cutting edge being disposed rearwardly of the midpoint between said pivot axes and tangents to said convex surface of said upper edge face rearwardly of said cutting edge being inclined at small angles to a line connecting said pivot axes to provide clearance.

7. A saw chain link according to claim 6 in which said depth gauge portion has a top surface lying in the surface of revolution as said upper edge face of the cutter portion, said top surface of the depth gauge portion being dressed down by engagement with cutting means as said link travels along said approximately circular path.

8. A saw chain link according to claim 6, in which the angle of inclination of said front face of the cutter portion to said line connecting said pivot axes is of the order of 40° to 50°.

9. A saw chain link according to claim 6, in which the cutting edge of said cutter portion as seen in plan view is inclined at an angle of the order of 65° to 75° to the medium plane of the body portion of said link.

10. A saw chain link according to claim 6, in which said cutting portion has a layer on its front face of harder more wear-resisting material than the body of said cutting portion.

11. In a chain saw, the combination of an elongated cutter bar, a chain sprocket at one end of said cutter bar, a saw chain running on said cutter bar and driven by said sprocket, said cutter bar and sprocket guiding said chain to travel in a curved path at the ends of said cutter bar and in a path of materially less curvature between said ends, said chain comprising connecting links and cutter links each comprising an approximately planar body portion, means adjacent opposite ends of said body portion pivotally connecting said cutter link with preceding and succeeding connecting links, a side portion extending upwardly from said body portion and offset laterally outwardly from the medium plane of said body portion, and a cutter portion extending from said side portion inwardly over said body portion at least to the longitudinal centerline of said chain, said cutter portion being defined by a front face inclined at an acute angle to a line connecting the pivot axes of said pivoted connecting means, a rear face substantially equidistant from said front face and an upper edge face defined by a convex surface of revolution concentric with said curved path at one end of said cutter bar, said upper edge face intersecting said rear face at an obtuse angle and intersecting said front face at an acute angle defining a cutting edge of said cutter portion, said cutting edge being disposed rearwardly of the midpoint between said pivot axes and tangents to said convex surface of said upper edge face rearwardly of said cutting edge being inclined at small angles to a line connecting said pivot axes to provide clearance, and means for sharpening said chain while running on said cutter bar, said sharpening means comprising abrasive means portioned to be engaged by and dress down the upper edge faces of said cutter links as said cutter links travel along said curved path at said one end of the cutter bar.

12. A combination in accordance with claim 11, in which said front face of the cutting portion of each of said cutter links is inclined at an angle of the order of 45° to said line connecting said pivot axes.

13. A combination in accordance with claim 11, in which each of said cutter links has at its forward end an upwardly projecting depth gauge having an upper end face defined by the same surface of revolution as the upper edge faces of said cutting portions, said depth gauges engaging and being dressed down by said abrasive means.

14. A combination in accordance with claim 11, in which said sharpening means comprises a sharpening member having a concave arcuate abrasive surface approximately concentric with said curved path at said one end of the cutter bar.

15. A combination in accordance with claim 13, in which said sharpening means comprises a sharpening member having a concave arcuate abrasive surface which is approximately concentric with said curved path at said one end of the cutter bar and has an extent in the direction of travel of the chain greater than the distance between the cutting edge and depth gauge of the respective cutter links.

16. A saw chain comprising: a plurality of pivotally connected links including center links and side links, certain of said side links being similar right- and left-hand cutter links, each of said cutter links having a link body having a forward portion and a rear portion and a hook-shaped cutting element including a shank extending outwardly from the rear portion of said link body, each of said cutter links being a one-piece, continuous, formed sheet of metal, said cutter element including a steeply forwardly and outwardly inclined top plate bent laterally from the outer end of said shank over said link body with the outer edge of said shank joined to a side edge of said top plate, said top plate having broad forward and rearward faces and an outer edge surface beveled rearwardly and inwardly from said forward face to said rearward face so as to form a continuous chisel cutting edge at the intersection of said outer edge surface and said forward face, said cutting edge being positioned rearwardly of the midpoint of a line joining of the axes of the pivotal connections of the cutter link having said cutter element.

17. In a saw chain having center links pivotally joined at their ends in succession to side links, certain of said side links being selected to form a cutting element, comprising:
 a. a flat link plate portion;
 b. a shank portion extending vertically and laterally outwardly from the rear portion of said link plate portion, the lateral extent of the shank portion decreasing progressively from the forward edge to the rearward edge thereof and the forward edge of said shank portion being sharpened to cut the sidewall of a kerf, the shank portion being beveled laterally inwardly from the forward edge;
 c. a cutter portion extending laterally inwardly from said shank portion, said cutter portion having first and second adjoining outer top surfaces and an under surface, said under surface extending laterally inwardly from said shank portion, said first top surface being beveled at its forward end to provide an outer surface which forms an angle of clearance with the adjacent kerf base being cut thereby, said under surface extending rearwardly under said first and second top surfaces for their combined full lengths, said cutter portion being tilted rearwardly toward said link plate portion at an angle greater than said angle of clearance, the tilt angle being in the direction of the second top and under surfaces; and d. a cutting edge formed by the convergence of the leading edge of said beveled top surface with the leading edge of said under surface of said cutter portion.

18. In a saw chain having center links pivotally joined at their end in succession to side links, certain of said side links being selected to form a cutting element comprising:

a. a flat link plate portion;

b. a shank portion extending vertically, outwardly, throughout its length from said link portion, the lateral extent of the shank portion decreasing progressively from the forward edge to the rearward edge thereof and offset from the vertical plane of the flat link plate, the forward edge of said shank portion being sharpened to cut a kerf sidewall;

c. a cutter portion supported on said shank portion, said cutter portion having first and second adjoining outer top surfaces and an undersurface, said first top surface being beveled at its forward end to provide an outer surface which forms an angle of clearance with the adjacent base kerf being cut thereby, said undersurface extending rearwardly under said first and second top surfaces for substantially their combined full lengths, and said cutter portion further extending transversely, inwardly from said shank portion and being tilted rearwardly toward said body portion at an angle greater than said angle of clearance, the angle of tilt being in the direction of the second top and under surface;

d. a cutting edge formed by the convergence of the leading edge margin of said beveled surface with the leading edge margin of said undersurface of said cutter portion; and e. a depth gauge on said side plate positioned forwardly of said cutting edge and extending vertically, outwardly from said link plate to engage the base of the kerf.

19. In a saw chain having center links pivotally joined at their ends in succession to side links, certain of said side links being selected to form a cutting element comprising:

a. a flat link plate portion;

b. a shank portion extending vertically, outwardly, throughout its length and offset from said link plate portion, the lateral extent of the shank portion decreasing progressively from the forward edge to the rearward edge thereof, and the forward edge of said shank portion being sharpened to cut a sidewall of a kerf;

c. a cutter portion, supported on said shank, said cutter portion having first and second adjoining top surfaces and an undersurface, said first top surface being beveled in an arc at its forward end to provide a surface which forms an angle of clearance with the adjacent base of a kerf being cut thereby, and said cutter portion further extending transversely inwardly from the outermost portion of said shank portion and being tilted rearwardly, toward said body portion at an angle greater than said angle of clearance, said under surface extending rearwardly under said first and second top surfaces for substantially their combined full lengths;

d. a cutting edge formed by the convergence of the leading edge margin of said beveled arc surface with the leading edge margin of said undersurface of said cutter portion and said cutting edge being transversed to the line of travel of the saw chain; and e. a depth gauge on said side plate positioned forward of said cutting edge and extending vertically from said link plate to engage the bottom of the kerf, said depth gauge being arced at its outermost surface, said arc being of the same equal radii as that of said beveled arc surface of said cutter portion, the center of said arc being centrally positioned relative to the hinge axis of the selected side links.

20. A cutter element for a saw chain comprising:

a. a link body portion forming a side link of a saw chain;

b. a cutter support means extending vertically outwardly from the rear upper portion of said link body portion, said support means being inclined inwardly from the forward edge to the rearward edge thereof;

c. a side cutting edge formed on the forward leading edge of said cutter support means to thereby cut the sidewall of a kerf;

d. a cutter portion supported on said cutter support means positioned at the outermost end thereof and extending laterally inwardly therefrom, said cutter portion having first and second adjoining outer top surfaces and an under surface, said under surface extending laterally inwardly from said cutter support means, said first top surface being beveled at its forward end to provide an outer surface which forms an angle of clearance with the adjacent kerf base being cut thereby, said under surface extending rearwardly under said first and second top surfaces for their combined full lengths, said cutter portion being tilted rearwardly toward said link body portion at an angle greater than said angle of clearance, the tilt angle being in the direction of the second top and under surface; and e. a cutting edge formed by the leading edge of said top beveled surface joining the leading edge of said under surface.

21. A cutter element for a saw chain comprising:

a. a side link body portion of a saw chain;

b. a shank portion extending vertically outwardly from the rear upper portion of said link body portion, said shank being inclined inwardly from the forward edge to the rearward edge thereof;

c. a side cutting edge formed on the forward leading edge of said shank portion to thereby cut the sidewall of a kerf;

d. a cutter portion extending laterally inwardly from said shank portion, said cutter portion having first and second adjoining outer top surfaces and an under surface, said under surface extending laterally inwardly from said shank portion, said first top surface having an arcuate bevel at its forward end to provide an outer surface which forms an angle of clearance with the adjacent kerf base being cut thereby, said under surface extending rearwardly under said first and second top surfaces for their combined full lengths, said cutter portion being tilted rearwardly toward said link body portion at an angle greater than said angle of clearance, the tilt angle being in the direction of the second top and under surface; and e. a cutting edge formed by the convergence of the leading edge of said beveled arcuate surface with the leading edge of said under surface of said cutter portion, f. said arcuate surface having its center centrally positioned relative to said link body portion.

22. A link for a top sharpening chain, said link being a one-piece, continuous, formed sheet of metal including a link body having a forward portion and a rear portion and an integral cutting element projecting outwardly from the rear portion of the body, said cutting element including a shank extending outwardly from the body and having a portion offset laterally with respect to the body and a top plate forming a continuation of the outer portion of the shank and bent laterally over the body and terminating on the side of the body opposite the shank, said top plate extending longitudinally of the cutter link and being steeply inclined forwardly and outwardly from the rearward end to the forward end of said top plate and having similarly inclined forward and rearward faces, said top plate also having a beveled, arcuate, sharpening surface at said forward end extending from said forward face to said rearward face and defining a laterally extending forwardly directed kerf bottom cutting edge at the intersection of the other surface and said forward face, and a depth gauge projecting outwardly from the forward end of said cutter link and having an outer edge surface extending outwardly from the body.

23. A saw chain according to claim 16 in which the leading edge of the shank portion of said cutting element is beveled to form a chisel cutting edge.

24. A saw chain according to claim 22 in which the leading edge of the shank portion of said cutting element is beveled to form a forwardly directed kerf side chisel cutting edge positioned forwardly of said cutting edge of said top plate.

25. A saw chain comprising: a plurality of pivotally connected links including center links and side links, certain of said side links being similar right- and left-hand cutter links, each of said cutter links having a link body having a forward end and a rear end and a hook-shaped cutting element extending outwardly from the rear portion of said link body, each of said cutter links being a one-piece, continuous, formed sheet of metal, said cutter element including a shank portion extending outwardly of said cutter body and a forwardly and outwardly inclined top plate forming a continuation of the outer portion of said shank portion and bent generally laterally over said link body from the outer end of said shank and having a forward face and a rearward face, a side edge of said top plate joining the outer edge of said shank, said top plate having forward and rearward faces and an outer edge surface beveled rearwardly and inwardly from said forward face to said rearward face and a continuous chisel cutting edge at the intersection of said outer edge surface and said forward face, said cutting edge being positioned rearwardly of the midpoint of a line joining the axes of the pivotal connections of the cutter link having said cutter element, each of said cutter links having a depth gauge extending outwardly from the forward portion of said link body and having its rearward edge positioned forwardly of said midpoint a greater distance than said cutting edge is positioned rearwardly of said midpoint.

26. In a top sharpening saw chain link, the link being solely a one-piece, continuous, formed sheet of metal and including: a body plate having a pair of pivot portions and also having a forward end, a rear end and an outer edge portion, an elongated top plate, and a shank connecting one edge portion of the top plate to the outer edge portion of the body plate, the entire top plate being to the rear of the midpoint of a line joining the pivot portions, the top plate being steeply inclined relative to said line and extending longitudinally rearwardly and inwardly relative to the body plate and at least the outer portion of the top plate lying in a plane tilted to a predetermined extent from the normal to the body plate, the forward, outer end of the top plate comprising an arcuate, abradable surface intersecting the forwardly and inwardly facing face of the top plate to form an acute cutting edge therewith which extends laterally and rearwardly relative to the body plate from the end of the cutting edge nearer to the shank and lies substantially in a plane normal to the body plate, the arcuate, abradable surface of the top plate being the outermost portion of the top plate and also intersecting the outer face of the top plate rearwardly of the cutting edge, the arcuate abradable surface having as the center thereof, when the link is advanced along an arcuate path, the center of said arcuate path.

27. In a top sharpening saw chain link adapted to be formed completely from a one-piece sheet metal blank, the link being formed solely from a one-piece, continuous sheet of metal and including: a body plate having an outer edge portion, a pair of pivot portions and a forward end and a rear end, an elongated, substantially planar top plate, and a shank connecting one side edge portion of the top plate to the outer edge portion of the body plate, the entire top plate being to the rear of the midpoint of a line joining the pivot portions, the top plate being steeply inclined relative to said line and extending longitudinally rearwardly and inwardly relative to the body plate and lying in a plane tilted to a predetermined extent from the normal to the body plate, the forward, outer end of the top plate comprising an arcuate abradable surface intersecting the forwardly and inwardly facing face of the top plate to form an acute cutting edge which extends laterally and rearwardly relative to the body plate from the end of the cutting edge nearer to the shank and lies substantially in a plane normal to the body plate, the arcuate, abradable surface of the top plate being the outermost portion of the top plate and also intersecting the outer face of the top plate rearwardly of the cutting edge, the arcuate abradable surface having as the center thereof, when the link is advanced by a drive sprocket of a chain saw, the axis of rotation of the sprocket.

28. A saw chain link of claim 27 wherein the top plate is inclined at an angle of between about 40° and about 50° relative to said line joining the pivot portions.

29. In a top sharpening saw chain link, the link being a single, continuous, formed metal sheet of substantially uniform thickness including: a body portion having a pair of spaced rivet holes and also having an outer edge portion, a forward end and a rear end, a shank portion extending laterally and outwardly from the body portion and secured to the outer edge portion of the body portion, and a top plate of abradable material lying in a plane extending primarily laterally from the shank portion and somewhat outwardly relative to the body portion and having one side edge portion joined to the outer edge portion of the shank portion along at least the major portion of the length of the top plate, the top plate longitudinally sloping rearwardly and inwardly relative to the body portion and the forward and outer edge thereof being a sharpening surface which intersects the sloping inner face of the top plate at the forward end thereof and at an acute angle relative to the inner face of the top plate to form therewith a cutting edge extending laterally and rearwardly from the shank portion, whereby the cutting edge can be sharpened by grinding the sharpening surface, the top plate being entirely to the rear of the midpoint of a line joining the rivet holes, the sharpening surface also intersecting the outer face of the top plate rearwardly of the cutting edge.

30. In a saw chain, a top sharpening one-piece link of formed sheet metal comprising: a body plate having a pair of spaced pivot portions and a forward end and a rear end, the body plate being adapted to serve as a side plate link and lying in a predetermined plane, the body plate having a first side face and a second side face, an elongated top plate positioned outwardly from and toward the rear of the body plate and longitudinally extending rearwardly and inwardly relative to the body plate, the top plate being substantially planar and being tilted a predetermined degree from the normal to the plane of the body plate, the top plate extending laterally across the body plate from one side edge portion of the top plate more adjacent to and offset laterally from the first face of the body plate to the other side edge portion of the top plate, the top plate having a forwardly and inwardly facing first face, a rearwardly and outwardly facing second face and a beveled abradable sharpening surface at the outermost and most forward edge thereof extending from the first face to the second face, the sharpening surface lying in a portion of a predetermined cylinder normal to the plane of the body plate and forming an acute cutting edge with the inwardly and forwardly facing face of the top plate, the cutting edge extending rearwardly and laterally across the body plate from said one side edge portion of the top plate, and a shank merging at one edge portion thereof with the outer edge portion of the body plate and forming a continuation thereof, the outer edge portion of the shank merging with and forming a continuation of said one side edge portion of the top plate.

31. In an automatically sharpenable saw chain link, the link being a single, continuous formed metal sheet of substantially uniform thickness including: a substantially planar body plate adapted to serve as a side plate for a saw chain and lying in a predetermined plane, the body plate having an outer edge portion, a pair of spaced pivot portions, a forward end and a rear end, a shank extending laterally in one direction and outwardly from the outer edge portion of the body plate, and an elongated, substantially planar top plate laterally extending primarily oppositely to said one direction and somewhat outwardly relative to the body plate from the outer edge portion of the shank and longitudinally extending rearwardly and inwardly relative to the body plate, the top plate being located entirely to the rear of the midpoint of a line extending from one pivot portion to the other pivot portion, the top plate having a beveled forward and outer edge surface lying in a cylinder normal to the plane of the body plate and adapted to be sharpened by contact with a sharpening member as the link is advanced around a drive sprocket of a chain saw, the top plate having a forwardly and inwardly facing face of the top plate and a rearwardly and outwardly facing face, the forward and outer edge surface of the top plate joining the forwardly and inwardly facing face and the rearwardly and outwardly facing face and defining with the forwardly and inwardly facing face of the top plate a cutting edge extending laterally and rearwardly relative to the body plate from the end of the cutting edge nearer to the shank.